United States Patent
Namou et al.

(10) Patent No.: US 9,702,773 B2
(45) Date of Patent: *Jul. 11, 2017

(54) DEFLECTION SENSITIVE COOLANT ACTIVATED DRAIN PLUG DETECTION SYSTEM FOR HIGH VOLTAGE BATTERY PACKS

(71) Applicant: GM Global Technology Operations LLC, Detroit, MI (US)

(72) Inventors: Andrew J. Namou, West Bloomfield, MI (US); Mahmoud H. Abd Elhamid, Troy, MI (US); Herman K. Phlegm, Oak Park, MI (US); Milind S. Gandhi, Shelby Township, MI (US); Andrew C. Brenz, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 252 days.

This patent is subject to a terminal disclaimer.

(21) Appl. No.: 14/698,916

(22) Filed: Apr. 29, 2015

(65) Prior Publication Data

US 2015/0323400 A1    Nov. 12, 2015

Related U.S. Application Data

(63) Continuation of application No. 13/736,200, filed on Jan. 8, 2013, now Pat. No. 9,068,900.

(51) Int. Cl.
*G01M 3/04* (2006.01)
*G01L 1/22* (2006.01)
(Continued)

(52) U.S. Cl.
CPC .......... *G01L 1/2262* (2013.01); *G01M 3/045* (2013.01); *G01M 3/26* (2013.01); *G01M 3/40* (2013.01)

(58) Field of Classification Search
CPC . A47K 1/14; E03C 1/23; E03C 1/2306; F16L 55/132; F16L 55/11; F16L 55/136; G01M 3/022; G01L 1/22
(Continued)

(56) References Cited

U.S. PATENT DOCUMENTS 3,586,018 A   6/1971  Bogardh et al.
3,688,581 A   9/1972  Le Quernec
(Continued)

FOREIGN PATENT DOCUMENTS

KR    1020120069238    12/2010

OTHER PUBLICATIONS

Miller-Chou, et al., A Review of Polymer Dissolution, Progress in Polymer Science, www.elsevier.com, Nov. 13, 2002, pp. 1223-1270, vol. 28, Cleveland, Ohio, USA.

*Primary Examiner* — John Fitzgerald
*Assistant Examiner* — Truong Phan
(74) *Attorney, Agent, or Firm* — Quinn IP Law

(57) ABSTRACT

A battery pack with a drain plug and a circuit to detect when a liquid coolant has entered the battery pack. A soluble plug may be disposed within the cavity of the carrier; the soluble plug is configured to at least partially dissolve when fluidly coupled with a coolant allowing a portion of the coolant to flow between the inlet and the outlet and out of the battery pack. A strain gauge cooperative with the carrier such that a measured resistance change in the strain gauge corresponds to the soluble plug in contact with the liquid coolant. An associated circuit with the drain plug provides notification of the activation of the drain plug to the on-board computer systems.

11 Claims, 7 Drawing Sheets

(51) Int. Cl.
*G01M 3/26* (2006.01)
*G01M 3/40* (2006.01)

(58) Field of Classification Search
USPC .......................................... 138/89, 90; 4/295
See application file for complete search history.

(56) References Cited

U.S. PATENT DOCUMENTS

| | | | |
|---|---|---|---|
| 4,146,775 A | | 3/1979 | Kirchner et al. |
| 4,276,711 A | * | 7/1981 | Mathauser ............ A01K 97/125 |
| | | | 43/17 |
| 6,249,556 B1 | * | 6/2001 | Rees ...................... H03K 5/086 |
| | | | 327/67 |
| 6,826,948 B1 | | 12/2004 | Bhatti et al. |
| 2002/0171565 A1 | * | 11/2002 | Scheib ............... H03K 17/9625 |
| | | | 341/34 |
| 2005/0092070 A1 | | 5/2005 | Bhatti |
| 2007/0174954 A1 | | 8/2007 | Millard |
| 2008/0076011 A1 | | 3/2008 | Emori et al. |
| 2008/0092258 A1 | | 4/2008 | Clarke et al. |
| 2009/0159311 A1 | | 6/2009 | Zheng et al. |
| 2012/0118583 A1 | | 5/2012 | Johnson et al. |

* cited by examiner

DEFLECTION SENSITIVE COOLANT ACTIVATED DRAIN PLUG DETECTION SYSTEM FOR HIGH VOLTAGE BATTERY PACKS

CROSS REFERENCE TO RELATED APPLICATIONS

The present application is a continuation of U.S. application Ser. No. 13/736,200 filed Jan. 8, 2013, titled "Deflection Sensitive Coolant Activated Drain Plug Detection System for High Voltage Battery Packs" and is related to U.S. application Ser. No. 13/736,197 filed Jan. 8, 2013 titled "Coolant Activated Rechargeable Energy Storage System Drain Plug."

BACKGROUND OF THE INVENTION

The invention relates generally to the thermal management of battery-based power systems, and more particularly to draining coolant in the event of a coolant breach within such a system.

Lithium-ion and related batteries, collectively known as a rechargeable energy storage system (RESS), are being used in automotive applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes batteries ideal to serve as part of a propulsion system for cars, trucks, buses, motorcycles and related vehicular platforms. In the present context, a cell is a single electrochemical unit, whereas a battery is made up of one or more cells joined in series, parallel or both, depending on desired output voltage and capacity.

Because an energized battery cell, module, section or pack is capable of producing large amounts of energy, temperature (and the removal of excess quantities thereof) is one of the most significant factors impacting both the performance and life of a battery. To keep temperature excesses from occurring, cooling systems are frequently integrated into a RESS based platform. In one conventional form, the cooling system circulates a liquid-based coolant using alcohol, water or a combination thereof. Typically, the RESS is configured to promote as much contact between the heat-generating portions of the individual cells and the coolant as possible. However, the same cooling system that provides necessary heat-removal may—in the event of an internal failure of one or more battery cells due to a crash event, component wear or a manufacturing defect—lead to leakage of the coolant onto sensitive electrical components (such as circuit boards or the like) in and around the individual cells. Such leakage may provide an efficient and unintended path for the conveyance of the electrical current being generated by the batteries such that in one undesirable form, the leaked coolant may lead to a short circuit of these sensitive system components.

It would be beneficial to provide early detection of loss of coolant into the battery following an accident or related incident to avoid harm to a RESS. It would be further beneficial to implement automated corrective actions in the event of a detected or imminent leakage of coolant into sensitive portions of a battery system.

SUMMARY OF THE INVENTION

In one embodiment, an apparatus for a drain plug may include a carrier configured to provide structural rigidity to the drain plug, the carrier defining a cavity therein, an inlet disposed on a first surface of the carrier, an outlet disposed on a second surface of the carrier, the first surface and the second surface fluidly displaced from one another and coupled to the cavity, a soluble plug disposed within the cavity of the carrier, the soluble plug is configured to at least partially dissolve when fluidly coupled with a coolant allowing a portion of the coolant to flow between the inlet and the outlet, and a strain gauge disposed within the cavity of the carrier such that a resistance change in the strain gauge corresponds to the dissolving soluble plug.

In another embodiment, an apparatus for a liquid cooled battery pack may include a plurality of batteries, a cooling circuit comprising a containment vessel couple with a cooling inlet and a cooling outlet enclosing a battery housing, the battery housing enclosing the plurality of batteries and comprising a drain outlet. A drain plug disposed within the drain outlet including a carrier configured to provide structural rigidity to the drain plug, the carrier defining a cavity therein, an inlet disposed on a first surface of the carrier, an outlet disposed on a second surface of the carrier, the first surface and the second surface fluidly displaced from one another and coupled to the cavity, and a soluble plug disposed within the cavity of the carrier. A strain gauge may be disposed within the cavity of the carrier and a circuit may be configured to measure an resistance change in the strain gauge and provide an indication when an output equals a threshold resistance value. A first lead and a second lead electrically couple the strain gauge to the circuit and the soluble plug is configured to at least partially dissolve when fluidly coupled with a coolant allowing a portion of the coolant to flow between the battery housing and the drain outlet.

In yet another embodiment, a method for draining a liquid coolant from an automotive liquid cooled battery pack may include circulating the liquid coolant around a battery housing of a battery pack, draining the liquid coolant from the battery housing with a drain plug in the event of a leak, the drain plug including a carrier configured to provide structural rigidity to the drain plug, the carrier defining a cavity therein, an inlet disposed on a first surface of the carrier, an outlet disposed on a second surface of the carrier, the first surface and the second surface fluidly displaced from one another and coupled to the cavity, a soluble plug disposed within the cavity of the carrier with an strain gauge disposed within the cavity of the carrier and indicating when the leak occurs using a circuit configured to measure a resistance change in the strain gauge.

These and additional features provided by the embodiments described herein will be more fully understood in view of the following detailed description, in conjunction with the drawings.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

The present application discloses several embodiments of a drain plug for use in a high voltage battery pack that may be used in the event of an electric vehicle crash or a liquid based coolant containment malfunction to avoid having the coolant provide an unintended electrical path or short out the batteries or the electronics associated with the battery pack. Embodiments of the drain plug allow for the coolant to be drained from the battery pack in the event of a crash or coolant containment malfunction when the drain plug comes into contact with the coolant before damage to the battery pack or associated electronics can occur. An associated circuit with the drain plug provides notification of the activation of the drain plug to the on-board computer systems.

Figure 1:
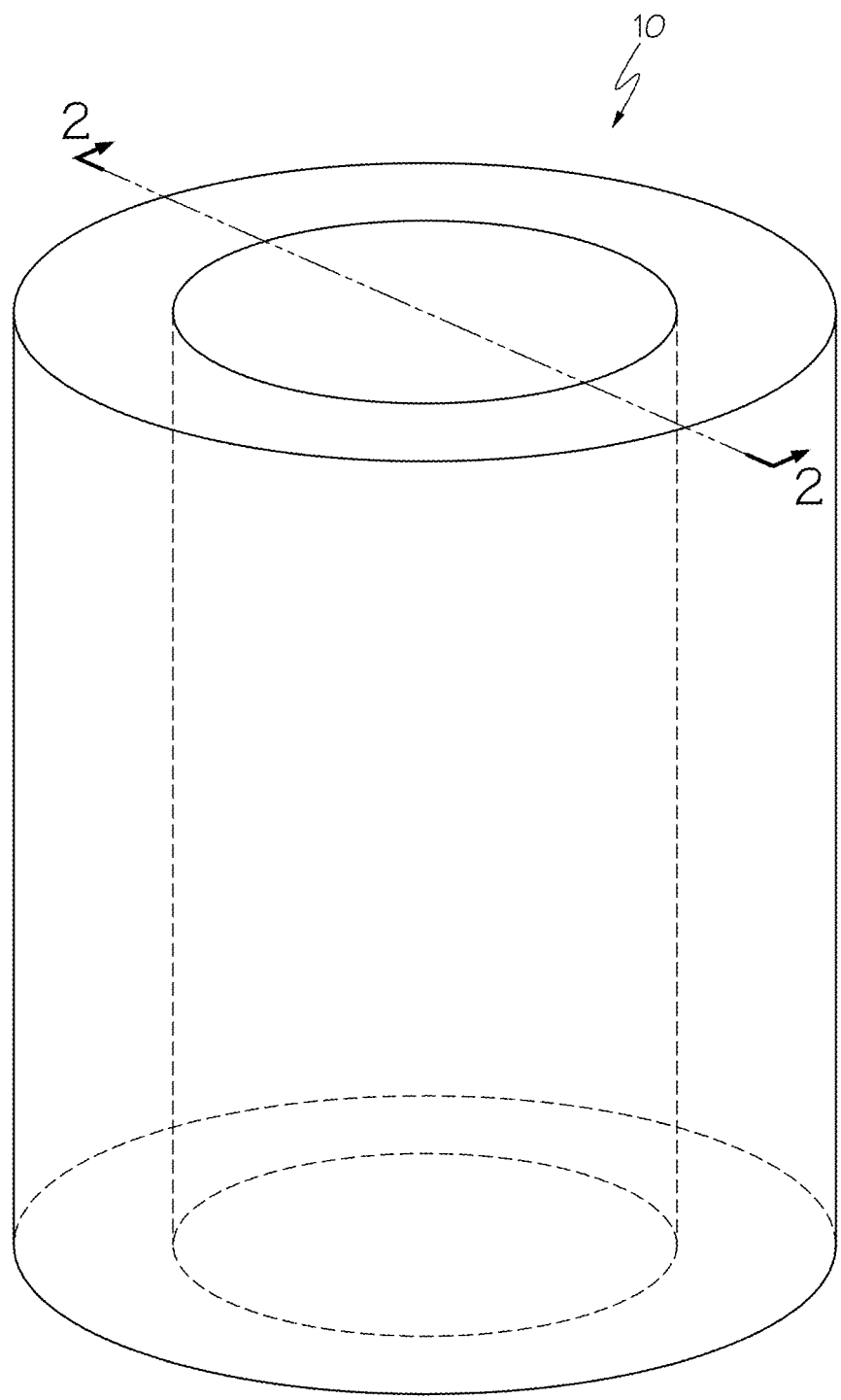
FIG. 1 is a perspective view of a coolant activated drain plug.
Figure 2:
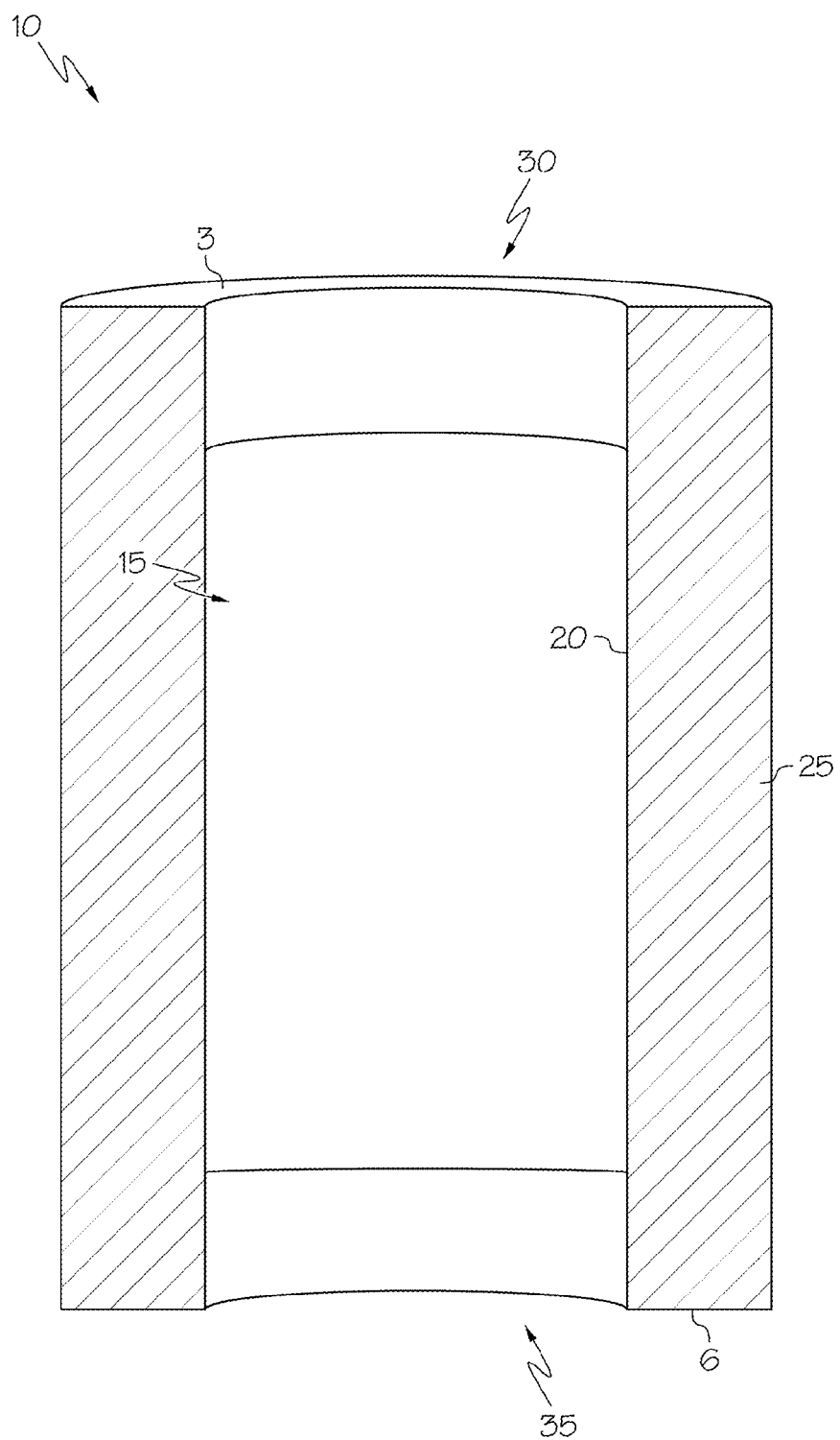
FIG. 2 shows a cross-section of the coolant activated drain plug of FIG. 1.

FIG. 1 is a perspective view of a coolant activated drain plug 10 showing the cross-sectional cut for FIG. 2. Referring now to FIG. 2, the drain plug 10 has a carrier 25 that serves as the structural rigidity and support for the drain plug 10. The carrier 25 has an inlet 30 on a first surface 3 and an outlet 35 on a second surface 6, the inlet 30 and the outlet 35 are spaced apart along the carrier 25 and structurally connected to the cavity 15. A soluble plug 20 is disposed within the cavity 15 and it may be a soluble polymer which will dissolve upon contact with the coolant or a non-soluble core with a soluble polymer coating. A polyvinyl alcohol (PVA) foam core is an example of a soluble polymer. The outlet 35 may be configured to drain the coolant out into the atmosphere or into a bladder or other containment device.

When a coolant leak occurs, the soluble plug 20 may first come into contact with the coolant at the inlet 30. A dissolving rate of the soluble plug is controlled by a number of factors to include: a height of the soluble plug, cross-linking density, humidity, and temperature. The height of the soluble plug 20 is the distance between the inlet 30 and the outlet 35 that the soluble plug 20 occupies within the cavity 15. The height of the soluble plug 20 may be adjusted to change the dissolving rate required before the drain plug 10 is opened at the outlet 35 and releases the coolant from the battery pack.

Figure 3A:
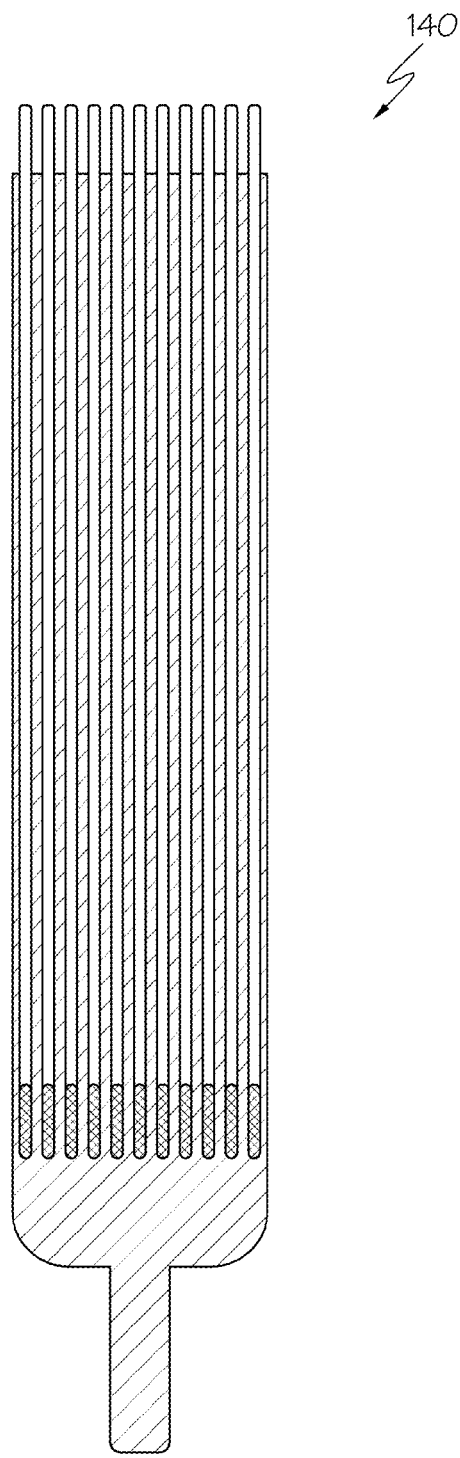
FIGS. 3A and 3B illustrate a strain gauge being placeable within a cavity of the drain plug.
Figure 3B:
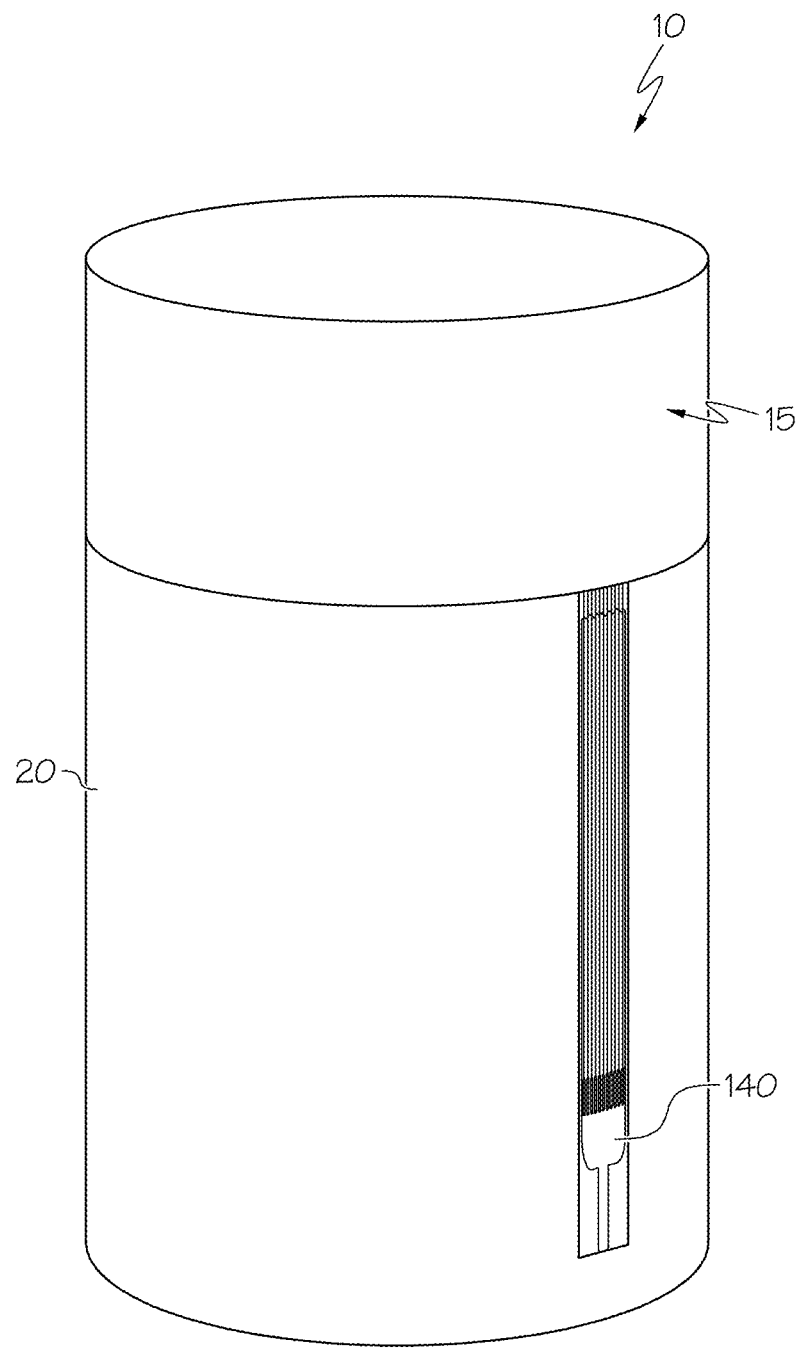

FIGS. 3A and 3B illustrate a strain gauge 140 being placeable within the cavity 15 of the drain plug 10. FIG. 3A depicts a non-limiting embodiment of the strain gauge 140. The strain gauge 140 is an electrical device where the resistance of the strain gauge 140 changes in response to an amount of deformation or tension the strain gauge is place under. The strain gauge 140 may be used to detect when the drain plug 10 is in a state of dissolving and it may be placed at varying heights within the soluble plug 20. This allows for a detection of coolant to occur at a specified point in the dissolving process or to monitor a dissolution rate of the soluble plug 20 and may be used to avoid false leak detection in the event of normal operation of the vehicle causes the soluble plug 20 to erode such as for example, temperature, caustic vapors, etc. The soluble plug 20 composition may be adjusted to match the humidity of the environment in which it is place to ensure that the drain plug 10 does not erode prematurely. As used throughout this application, eroding is the wearing away of the soluble plug 20 due to other factors besides dissolving.

Referring to FIG. 3B, the strain gauge 140 may be cooperative with the carrier 25 in any orientation desired to detect the deformation of the soluble plug 20 as the soluble plug 20 dissolves. The illustration in FIG. 3B is not limited to a vertical orientation but may be horizontal or any X-Y-Z orientation needed to detect when the soluble plug 20 is deforming or dissolving. The strain gauge 140 may be made from very thin conductors, for example a thin foil where the electrical resistance would be a function of the material's geometry, the conductors may be a round wire with a diameter of about 0.0254 mm (1/1000 inch), or thin strips of a metallic film depositing on a non-conducting flexible substrate. The non-conducting flexible substrate may be a polymer, a cellulose product, or similar substrate.

In some embodiments, the strain gauge 140 is disposed within the cavity 25. In another embodiment, the strain gauge 140 is coupled to the soluble plug 20 in a tension state. When the strain gauge 140 is under tension in the tension state, a tension resistance value of the strain gauge 140 is known. As the soluble plug 20 dissolves when it is in fluid contact with the coolant, the tension of the strain gauge 140 is released and the strain gauge returns to a rest state. When the strain gauge 140 is in the rest state, a rest resistance value of the strain gauge 140 is known. A circuit 200, as shown below in FIG. 4, electrically senses the change in the resistance of the strain gauge 140 as it changes from the tension resistance value to the rest resistance value. When a threshold resistance value is crossed, the circuit 200 provides an indication that a coolant leak has occurred.

In some embodiments, the strain gauge 140 is disposed within the cavity 25 in the rest state. In another embodiment, the strain gauge 140 is coupled to the soluble plug 20 in the rest state. The process of dissolving the soluble plug 20 may induce a tension on the strain gauge 140 causing the threshold resistance value to be reached and a leak indicated. The tension may be induced, for example, by loss of structural rigidity of the carrier 25 or an weight being placed in an end of the strain gauge 140 inducing tension as gravity pulls the on the weight as it is released from the dissolving soluble plug 20.

Figure 4:
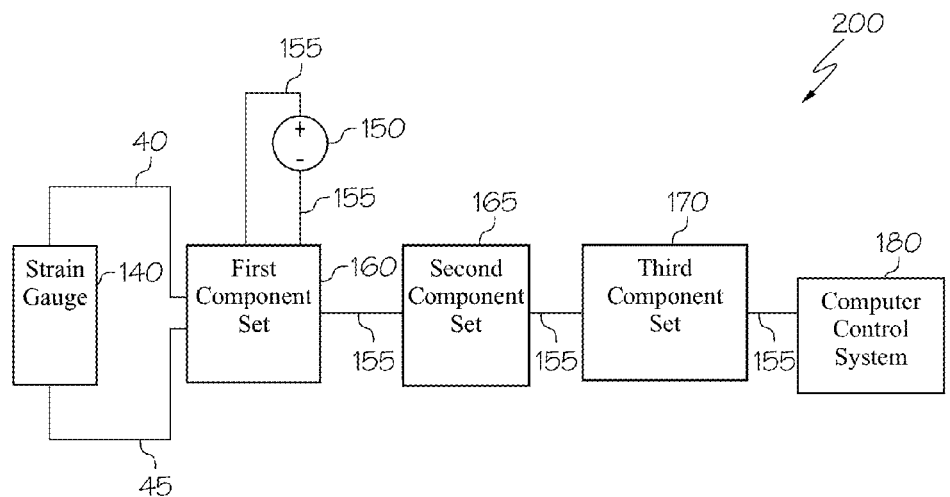
FIG. 4 depicts the component sets of a circuit used to indicate a coolant leak has occurred.

FIG. 4 is a schematic view of the circuit 200 used in the some of the embodiments described above to provide the indication that a coolant leak has occurred in the battery pack. The circuit 200 monitors the change in resistance of the strain gauge 140 as it changes while the soluble plug may be dissolving. When the threshold resistance value is crossed, the circuit 200 provides an indication that a coolant leak has occurred. The indication notifies a computer control system 180 of the vehicle or a driver that there is the coolant leak. The circuit 200 may be electrically connected to the strain gauge 140 of the drain plug through the first lead 40 and the second lead 45. In some embodiments, the circuit 200 may be a simple set of leads (the first lead 40 and the second lead 45) connecting the strain gauge 140 to the computer control system 180 and the computer control system 180 electrically senses the change in the resistance of the strain gauge 140 and determines when the soluble plug 20 of FIG. 2 is dissolving.

In another embodiment, the circuit 200 may have two or more component sets electrically connected by a plurality of electrical connections 155 to provide the indication. A first component set 160 may be a detection circuit such as a bridge measurement circuit, for example, a Wheatstone bridge circuit or full-bridge, a half-bridge, or a quarter-bridge circuit. The bridge measurement circuit provides a charge balanced circuit that is able to detect a small change in the physical tension of the strain gauge 140. For example, in the event that physical deformation in the soluble plug 20 occurs, the balance of voltage shifts within the bridge measurement circuit causing electrical changes at the output of the bridge measurement circuit that can be detected. Thus, the bridge measurement circuit converts a change in resistance of the strain gauge 140 to a voltage to be sensed. Changes in the strain gauge 140 are also nearly linearly related with a change in the voltage output of the bridge measurement circuit. In the strain gauge 140 design the output is not sensitive to any physical gap within the soluble plug 20 but only to the changes in tension or strain of the strain gauge 140 being held in position by the soluble plug 20. Therefore, the soluble plug 20 may be completely submersed in a conductive fluid, such as the coolant for example, and be robust against alterations in the output of the bridge measurement circuit.

A second component set 165 may be a comparator circuit which may be an op-amp circuit, or a dedicated comparator chip. The second component set 165 senses a change in the balance of the circuit of the first component set 160 and provides an indication output that the threshold resistance value has been crossed in the first component set 160. A third component set 170 may be an analog to digital (A/D) circuit to output a digital signal for use by the computer control system. A voltage source 150 is connected to the circuit 200 by the plurality of electrical connections 155 to power the circuit 200 and may be electrically connected to any of the two or more component sets. The voltage source 150 is shown to be electrically connection to the first component set 160 in FIG. 8. The circuit 200 may be a dedicated printed circuit, part of a larger circuit board integrated with the computer control system, be an application specific integrated circuit (ASIC), or have the electrical components printed and or secured on the soluble plug 20 and/or carrier 25 of FIG. 2.

Figure 5:
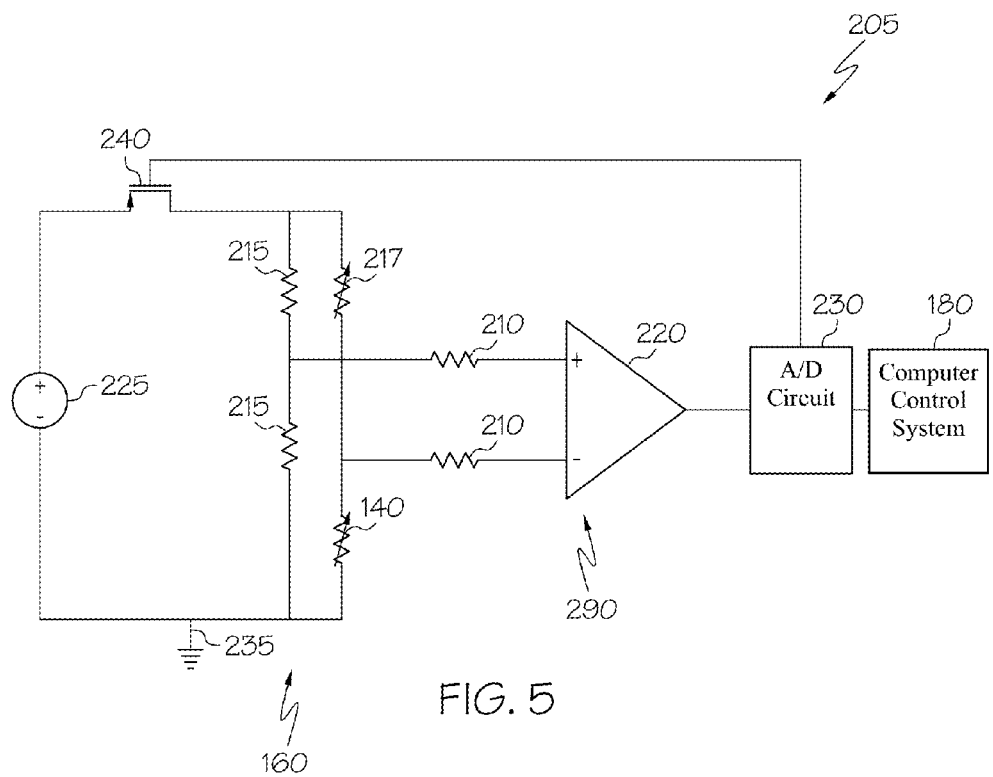
FIG. 5 is an electrical schematic of a single strain gauge-based circuit.

FIG. 5 depicts a single strain gauge circuit 205 for use with the drain plug in FIG. 7B. The voltage source 225 in conjunction with the ground source 235 provides the voltage bias to power the single strain gauge circuit 205. A high speed pulsing switch 240 synchronizes the output of an op-amp 222 to the A/D circuit 230 for output to the computer control system 180. A plurality of resistors 215 in conjunction with the strain gauge 140 and a variable resistor 217 define the single strain gauge circuit 205 as a Wheatstone bridge circuit. The plurality of resistors 215 has an equal resistance value. A plurality of op-amp resistors 210 help regulate an op-amp current and are also equal in resistance value to provide a specifically prescribed balance magnitude to measure scaled for a particular input system. The op-amp 222 and the plurality of op-amp resistors 210 define a comparator circuit 290 used to measure the change in balance across the single strain gauge circuit 205.

The change in foil elements of the strain gauge 140 under tension once the soluble plug 20 comes into contact with the coolant a resultant increase in electrical resistance may be sensed by the circuit 200. Along with the known resistance values of the plurality of resistors 215 and the variable resistor 217, the change in the resistance of the strain gauge 140 causes an electrical imbalance in the bridge circuit which in turn produces a change in a strain voltage value at the input of the op-amp 222. The variable resistor 217 may be printed onto the soluble plug or it may be a separate resistor as part of the circuit board. A plurality of op-amp resistors 210 help regulate an op-amp current and may also be equal in resistance value. The op-amp 222 will output a wave signal that either increase or decrease in amplitude as the strain gauge changes to the rest state. The wave signal will be converted to a digital signal by the A/D circuit 230 and sent to the computer control system 180. The first component set 160 shown in FIG. 5 may be the quarter-bridge circuit.

Figure 6:
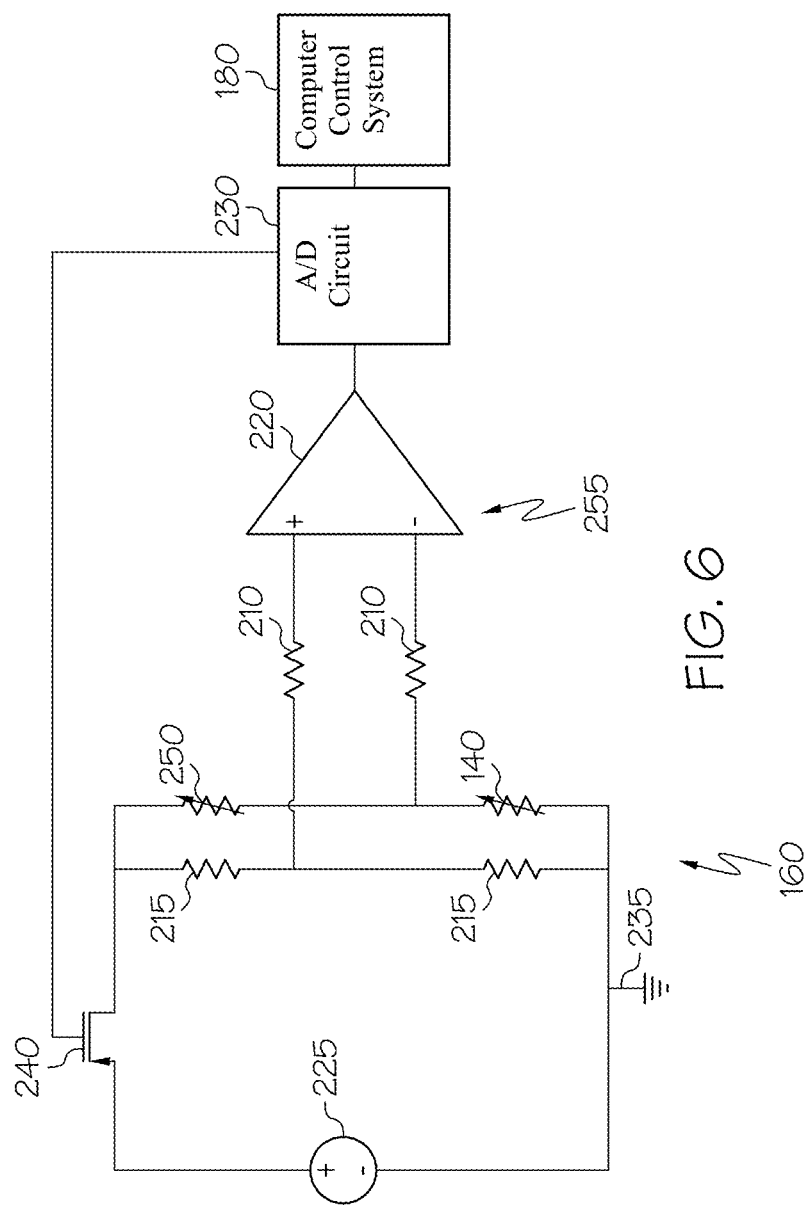
FIG. 6 is an electrical schematic of a double strain gauge-based circuit with a dummy gauge to compensate for temperature variations of the soluble plug.

FIG. 6 depicts a double strain gauge circuit 255 as a Wheatstone bridge circuit. The double strain gauge circuit 255 has a strain gauge 140 and a dummy gauge 250. The dummy gauge 250 may be used to compensate for temperature variations of the soluble plug and is placeable within the cavity or coupled to the carrier. The voltage source 225 in conjunction with the ground source 235 powers the double strain gauge circuit 255. The high speed pulsing switch 240 synchronizes the output of an op-amp 222 to the A/D circuit 230 for output to the computer control system 180. The plurality of resistors 215 in conjunction with the strain gauge 140 and the dummy gauge 250 define the double strain gauge circuit 255. The plurality of resistors 215 has an equal resistance value. The plurality of op-amp resistors 210 help regulate the op-amp current and may also be equal in resistance value to provide a specifically prescribed balance magnitude to measure scaled for a particular input system. The op-amp 222 and the plurality of op-amp resistors 210 define a comparator circuit 290 used to measure the change in balance across the double strain gauge circuit 255. The first component set 160 shown in FIG. 4 may be the half-bridge circuit.

The dummy gauge 250 aids the double strain gauge circuit 255 to compensate for temperature variation. The dummy gauge 250 is left in the rest state while the strain gauge 140 is in the tension state. In some embodiments, the dummy gauge 250 is printed near the strain gauge 140 on the soluble plug or on the carrier. The resistance of the dummy gauge 250 in the rest state may equal the resistance of the strain gauge 140 in the rest state. As the temperature of the soluble plug changes, the resistance of both the dummy gauge 250 and the strain gauge 140 increases or decreases by the same amount. This allows the double strain gauge circuit 255 to remain balanced and not vary the voltage to the op-amp 222 as the temperature changes.

It should be understood that the first component set 160 may be disposed within the cavity 1515 or coupled to the carrier 25. The dummy gauge 250, the plurality of resistors, 215, and/or the variable resistor 217 may be imprinted on a circuit board, the soluble plug 20, or the inside of the carrier 25 within the cavity 15. Furthermore, the dummy gauge 250, the plurality of resistors 215, and/or the variable resistor 217 may be coupled to the exterior of the carrier 25.

Figure 7:
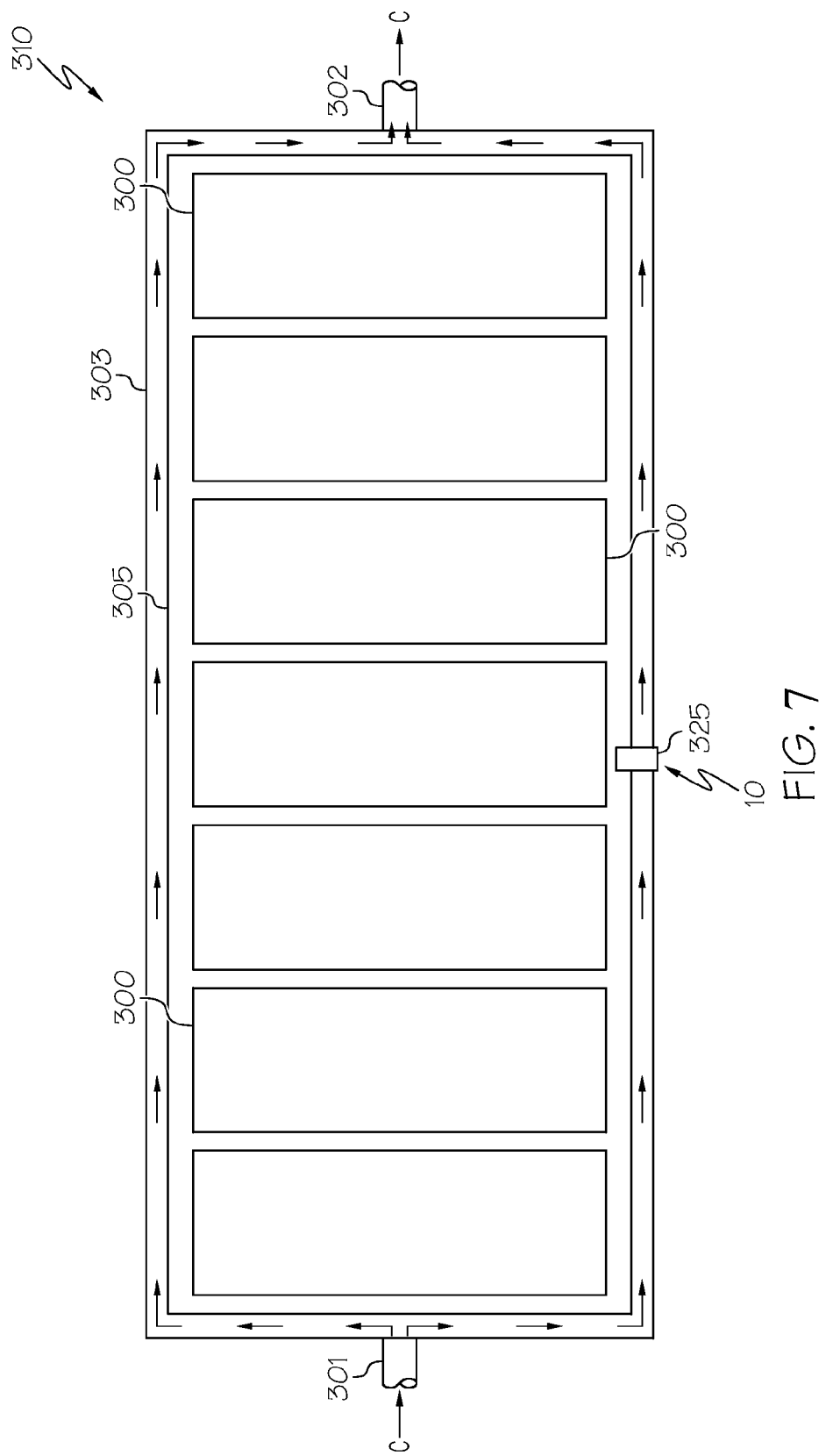
FIG. 7 illustrates a liquid cooled battery pack.

FIG. 7 illustrates a plurality of batteries 300 located within a battery housing 305 of a liquid cooled battery pack 310. A liquid coolant (the coolant) flows through a cooling circuit "C" around the battery housing 305 too cool and maintain a temperature of the liquid cooled battery pack 310. The cooling circuit "C" comprising a containment vessel 303 couple with a cooling inlet 301 and a cooling outlet 302 and enclosing the battery housing 305. A drain outlet 325 may be located anywhere along the battery housing 305 and may not drain back into the cooling circuit "C". The drain plug 10 may be disposed within the drain outlet 325 and drain the liquid coolant from the battery housing 305 in the event of a leak. When the coolant penetrates the battery housing, the soluble plug 15 from FIG. 2 in the drain plug 10 may start to partially dissolve when fluidly coupled with the coolant and allow a portion of the coolant to flow between the battery housing 305 and the drain outlet 325. In some embodiments, the plurality of batteries may be lithium-ion batteries.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, for the purposes of describing and defining the present invention, it is noted that the term "device" is utilized herein to represent a combination of components and individual components, regardless of whether the components are combined with other components. For example, a "device" according to the present invention may comprise an electrochemical conversion assembly or fuel cell, as well as a larger structure (such as a vehicle) that incorporates an electrochemical conversion assembly according to the present invention. Moreover, the term "substantially" is utilized herein to represent the inherent degree of uncertainty that may be attributed to any quantitative comparison, value, measurement, or other representation. As such, it may represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A drain plug apparatus comprising:
   a carrier defining a cavity therein;
   an inlet disposed on a first surface of the carrier;
   an outlet disposed on a second surface of the carrier, the first surface and the second surface fluidly displaced from one another and coupled to the cavity;
   a soluble plug disposed within the cavity of the carrier, the soluble plug configured to at least partially dissolve when fluidly coupled with a coolant to allow a portion of the coolant to flow between the inlet and the outlet; and
   a strain gauge cooperative with carrier such that a measured resistance change in the strain gauge corresponds to the dissolving soluble plug.

2. The drain plug of claim 1, wherein the strain gauge comprises thin conductors.

3. The drain plug of claim 1, wherein the soluble plug is non-soluble core with a soluble polymer coating.

4. The drain plug of claim 1, wherein the strain gauge is disposed within the cavity.

5. The drain plug of claim 1, wherein the strain gauge is coupled with the soluble plug.

6. The drain plug of claim 1, further comprising:
   a circuit configured to measure the resistance change in the strain gauge and provide an indication when an output equals a threshold resistance value, the circuit comprising:
      a comparator circuit and a bridge measurement circuit, the bridge measurement circuit comprising:
         a plurality of resistors; and
         a variable resistor, the plurality of resistors, and the strain gauge are electrically coupled together; and
      a first lead and a second lead, the first lead and the second lead electrically couple the strain gauge to the circuit.

7. The drain plug of claim 6, wherein the plurality of resistors are disposed within the cavity.

8. The drain plug of claim 6, wherein the plurality of resistors are couple to the carrier.

9. The drain plug of claim 6, wherein the comparator circuit is a high precision differential op-amp circuit.

10. The drain plug of claim 6, wherein the variable resistor is a dummy gauge.

11. The drain plug of claim 10, wherein the dummy gauge is coupled to the carrier in a rest state.

* * * * *